United States Patent
Sakai

(10) Patent No.: US 7,277,122 B2
(45) Date of Patent: Oct. 2, 2007

(54) IMAGE SURVEILLANCE SYSTEM PROCESSING USER'S VOICE REQUEST TO PROVIDE ACCESS AUTHORITY LEVEL OF EACH CLIENT IN THE SYSTEM

(75) Inventor: Keiichi Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/381,032

(22) Filed: May 1, 2006

(65) Prior Publication Data

US 2006/0195574 A1  Aug. 31, 2006

Related U.S. Application Data

(62) Division of application No. 09/277,821, filed on Mar. 29, 1999, now abandoned.

(30) Foreign Application Priority Data

Mar. 31, 1998  (JP) ................................. 10-087649

(51) Int. Cl.
  *H04N 7/18*  (2006.01)
(52) U.S. Cl. ...................... 348/143; 348/152; 348/156
(58) Field of Classification Search ................ 348/143, 348/152, 156; 340/539.14, 635, 506, 505; 709/225

See application file for complete search history.

(56) References Cited

U.S. PATENT DOCUMENTS

| 5,032,979 A | 7/1991 | Hecht et al. ................. 713/201 |
| 5,111,291 A * | 5/1992 | Erickson et al. ............. 348/152 |
| 5,382,943 A | 1/1995 | Tanaka ........................ 340/539 |
| 5,553,609 A | 9/1996 | Chen et al. .................. 600/301 |
| 5,619,183 A * | 4/1997 | Ziegra et al. ................ 340/505 |
| 5,774,841 A | 6/1998 | Salazar et al. ............... 704/225 |
| 5,790,176 A | 8/1998 | Craig .......................... 725/115 |
| 5,812,054 A * | 9/1998 | Cohen ......................... 340/506 |
| 5,815,080 A * | 9/1998 | Taguchi ....................... 340/635 |
| 5,892,442 A * | 4/1999 | Ozery ................... 340/539.14 |
| 5,943,478 A | 8/1999 | Aggarwal et al. ........... 713/201 |
| 6,097,429 A | 8/2000 | Seeley et al. ................ 348/154 |
| 6,223,292 B1 | 4/2001 | Dean et al. .................. 713/202 |
| 6,618,074 B1 * | 9/2003 | Seeley et al. ................ 348/143 |
| 6,665,004 B1 * | 12/2003 | Paff ............................ 348/156 |
| 6,697,103 B1 * | 2/2004 | Fernandez et al. .......... 348/143 |
| 6,714,238 B2 | 3/2004 | Urisaka et al. ......... 348/211.99 |

FOREIGN PATENT DOCUMENTS

JP  9-247637 A  9/1997

* cited by examiner

*Primary Examiner*—Le Hien Luu
(74) *Attorney, Agent, or Firm*—Fitzpatrick, Cella, Harper & Scinto

(57) ABSTRACT

Information identifying an operator remotely controlling a camera can be obtained. By using voice as means for reporting the information, it is possible to achieve reporting that is ideal for a user interface. Specifically, a client (116) is connected to a camera server (101) via a network and is receiving a video service obtained from a camera unit (102). When an individual on the side of the camera server (101) issues a request for the purpose of identifying the client, e.g., an inquiry as to who is controlling the camera, by voice, the voice is recognized. In response, information (the user name) identifying a connected client or the client controlling the camera is obtained by voice from a speaker (112).

12 Claims, 12 Drawing Sheets

FIG.12

| IP ADDRESS | MACHINE NAME | TYPE | USER | FLAG |
|---|---|---|---|---|
| 172.20.20.XX | laurel | PERSONAL | SAKAI | |
| 172.20.20.YY | miggy2 | PERSONAL | AIZAWA | ○ |
| 172.20.20.ZZ | cavax3 | SHARED | | |
| ⋮ | | | | |

"WHO ARE YOU?"
"AIZAWA"

"WHERE ARE YOU OPERATING THE CAMERA FROM?"
"FROM MIGGY 2"

FIG.15

| NO. | OBJECT NAME |
|---|---|
| 1 | SECTION CHIEF A's SEAT |
| 2 | DOOR |
| 3 | SECTION STAFF MEMBER B's SEAT |
| 4 | SECTION STAFF MEMBER C's SEAT |
| 5 | COPIER |

FIG.16

| T \ P | 0 | 1 | 2 | 3 | ... | 30 | 31 |
|---|---|---|---|---|---|---|---|
| 0 | 2 | 2 | 2 | 3 | ... | 5 | 5 |
| 1 | 2 | 2 | 2 | 3 | ... | 5 | 5 |
| 2 | 2 | 2 | 2 | 3 | ... | 5 | 5 |
| 3 | 2 | 2 | 2 | 3 | ... | 5 | 5 |
| ... | | | | | | | |
| 14 | | | | | | | |
| 15 | | | | | | | |

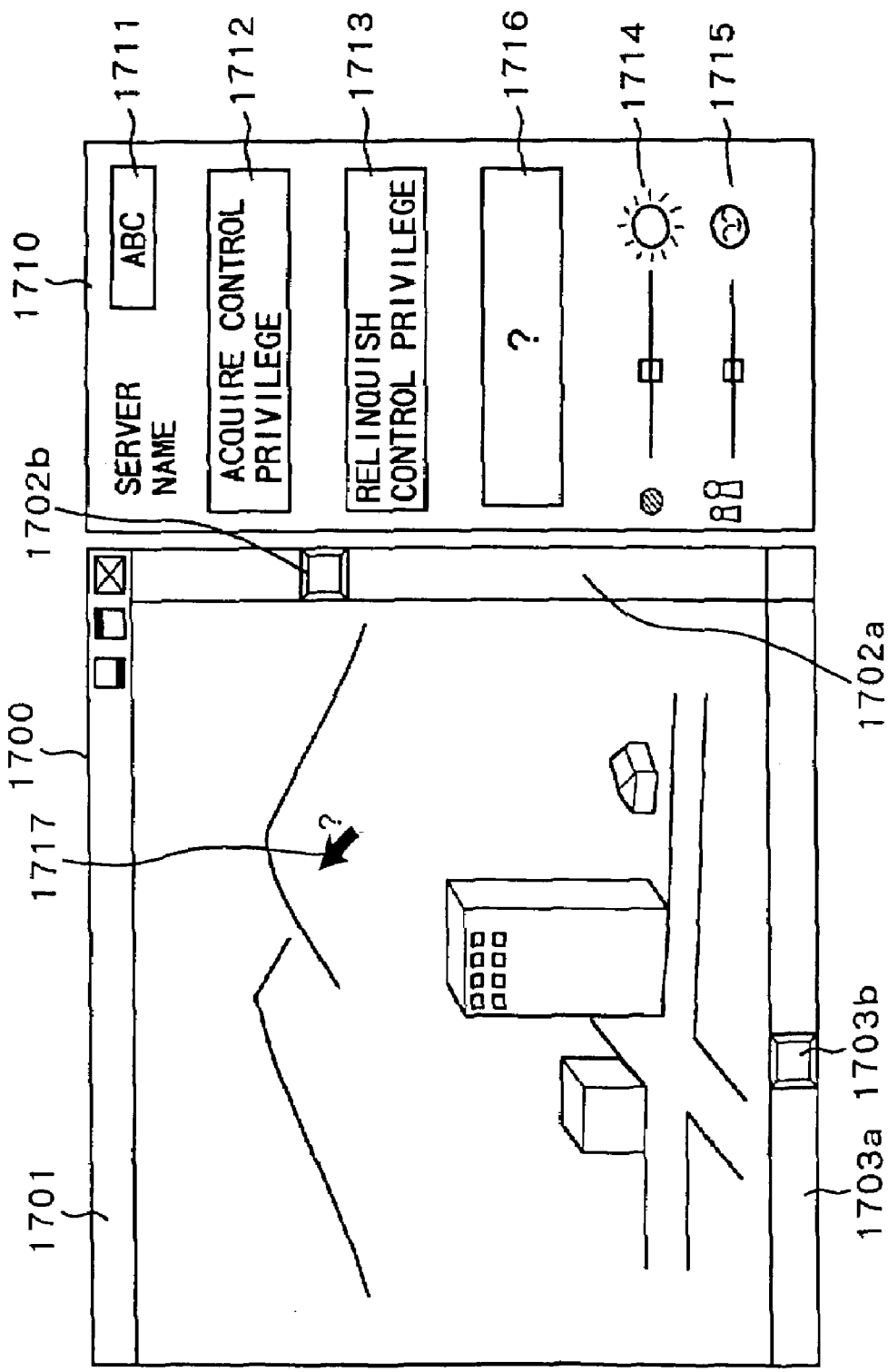

IMAGE SURVEILLANCE SYSTEM PROCESSING USER'S VOICE REQUEST TO PROVIDE ACCESS AUTHORITY LEVEL OF EACH CLIENT IN THE SYSTEM

CROSS-REFERENCE TO RELATED APPLICATIONS

This application is a divisional of U.S. patent application Ser. No. 09/277,821, filed Mar. 29, 1999 and claims benefit of the filing date of that application, and priority benefit of the filing date of Japanese patent application No. 10-087649 filed Mar. 31, 1998. The entire disclosure of the prior application is incorporated herein by reference.

BACKGROUND OF THE INVENTION

This invention relates to a server, a server system, a client, a server control method and a storage medium for furnishing a client with a service in which video that has been captured by image sensing means is transferred to the client via a network.

A camera control system in which image sensing means such as a camera accompanying (connected to) a computer is remotely controlled (to change its panning angle, angle of tilt, zoom magnification, etc.) from another computer via a network finds use in a remote surveillance system and in an image distribution system for real-time distribution of images on the Internet.

With the prior-art camera control system mentioned above, however, someone not present can control the camera at will and the person being watched by the camera cannot tell who is watching from where.

SUMMARY OF THE INVENTION

A first object of the present invention is to provide a server, a server system, a client, a server control method and a storage medium through which information relating to a connected user is capable of being ascertained on the server side.

A second object of the present invention is to provide a server, a server system, a client, a server control method and a storage medium through which it is possible to ascertain an object within the shooting field of view of a camera.

The present invention provides a server for making it possible for a remote client to control image sensing means via a network and for providing a transfer service to transfer video information, which has been captured by the image sensing means, to the client via the network, comprising input means for entering a request for information identifying the client to which the video information captured by the image sensing means is transferred, and notification means responsive to the entered request for reporting the information identifying the client.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a diagram showing the content of a client-information storage area reserved in a RAM within the camera server according to this embodiment;

FIG. 15 is a diagram illustrating the content of a table showing the relationship between numbers and the names of objects that appear in FIG. 14

FIG. 16 is a diagram showing an example of an example of a plane at a zoom value "2" in FIG. 14; and FIG. 17 is a diagram showing an example of a screen provided on the client side in a third embodiment.

DESCRIPTION OF THE PREFERRED EMBODIMENTS

Embodiments of the present invention will now be described in detail with reference to the accompanying drawings.

Figure 1:
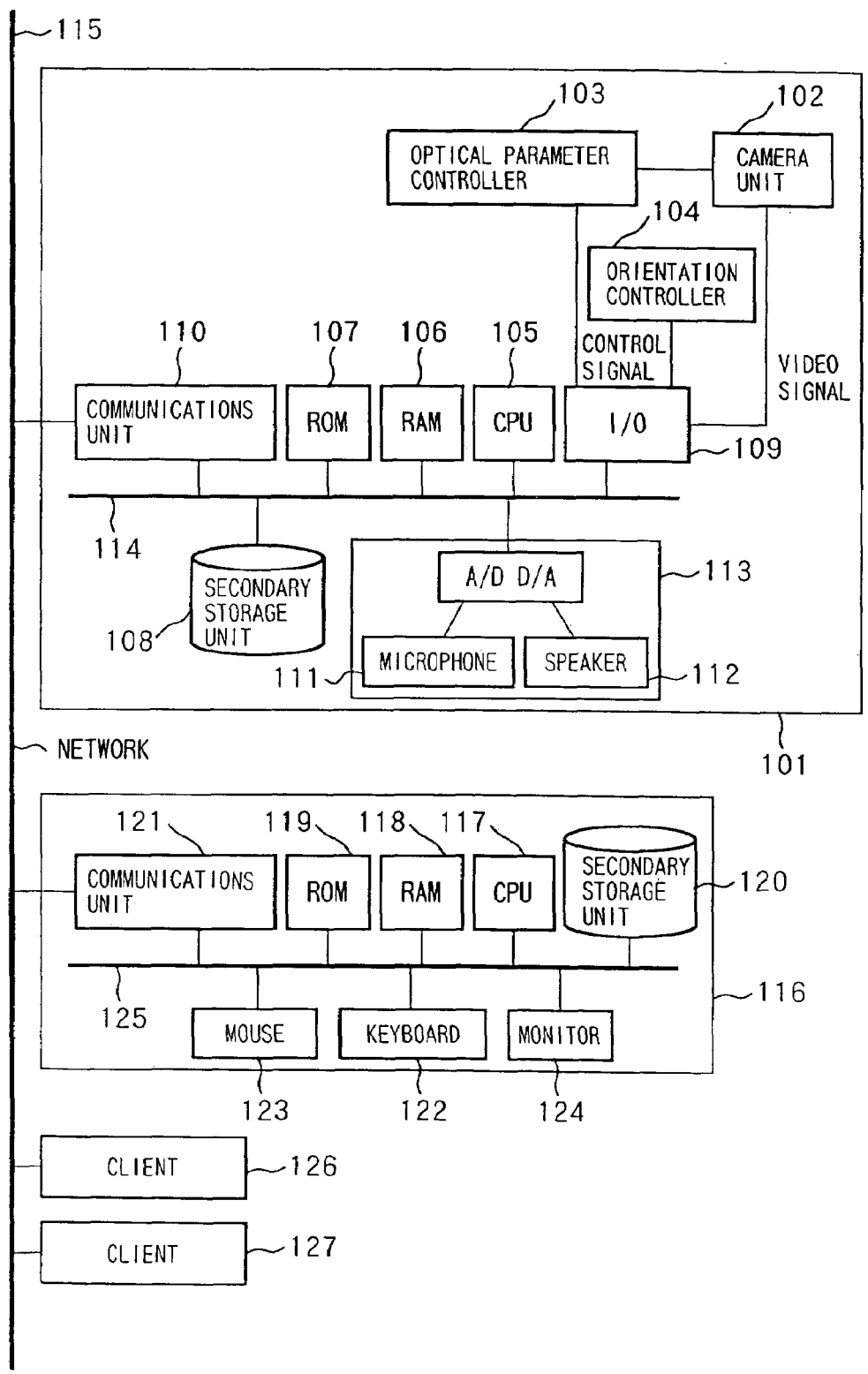
FIG. 1 is a block diagram showing a camera control system according to an embodiment of the present invention.

FIG. 1 shows the configuration of a system according to an embodiment of the present invention. Shown in FIG. 1 is a camera system 101 comprising components 102 to 114 described below. Numerals 116, 126, 127 denote computer terminals (referred to as clients below), each of which comprises components 117 to 125.

The camera system 101 includes a camera unit 102 for inputting images, an optical parameter controller 103 and a camera orientation controller 104 for controlling shooting orientation angles of the camera unit. Optical control includes control of focus, iris, shutter speed, gain, white balance and zoom magnification. The orientation controlled is the panning angle and tilt angle of the camera. Specifically, the camera orientation controller 104 is constituted by a pan head on which the camera unit 102 is mounted, and a circuit for controlling a motor with which the panning head is provided.

Since the camera system 101 supplies the terminals 116, 126, 127 with video shot by the camera unit 102, the camera system shall be referred to as a camera server and the terminals 116, 126, 127 as clients. Though one camera server and three clients are illustrated in FIG. 1, the present invention is not limited to these numbers. Further, client and camera server combinations may be established at respective locations. In such case participants in the system will be capable of conversing while observing one another. In certain cases a large number of users may display their own video on the display screens.

As shown in FIG. 1, various signal lines are connected to an input/output (I/O) unit 109 to supply the optical parameter controller 103 and camera orientation controller 104 with various control signals from the system and to input (capture) video data acquired by the camera unit 102. Examples of the control signal lines include RS232C and parallel I/O. A video output signal from the camera unit 102, which is in accordance with the NTSC format or employs the YC separation scheme, is connected to a capture circuit (located within the input/output unit 109) that converts this video signal to a digital video signal. The camera server of this embodiment basically is constituted by a workstation or personal computer. A video capture card is therefore installed in order to introduce the video signals.

A communications unit 110 transmits control instructions, the video output signal obtained by the camera unit 102 and the client's own information to the client through a network 115. The communications unit 110 uses an Ethernet card if the network 115 is the Ethernet, a modem if the network 115 is a telephone line, etc. A voice input/output unit 113 converts voice, which has entered from a microphone 111, from an analog to a digital signal and inputs the digital signal to the camera server as an audio signal, and converts a digital audio signal to an analog signal and outputs the latter from a speaker 112.

The input/output unit 109, a CPU 105, a RAM 106, a ROM 107, a secondary storage unit (e.g., a hard disk device) 108, the communications unit 110 and the voice input/output unit 113 are connected to a bus 114. Because a workstation or personal computer are usually provided with these components, these components need not be described in detail here.

The client 116 (and the clients 126, 127 as well) requires a communications unit 121 in order to be connected to the network 115. The client 116 is basically constituted by a workstation or personal computer, in the same manner as the camera server, and has a CPU 117, a RAM 118, a RAM 119 and a secondary storage unit 120. The communications unit 121 communicates control instructions, a video output signal from a camera unit and its own client information with the camera system 101. The client 116 also includes a keyboard 122, a mouse 123 and a monitor 124. The CPU 117, RAM 118, ROM 119, secondary storage unit 120, communications unit 121, keyboard 122, mouse 123 and monitor 124 are connected to a bus 125.

The camera server 101 and the plurality of clients 116, 126, 127 are connected to the network 115. Devices for other objectives (e.g., a file server, etc.) may be connected to the network 115 if desired.

Figure 2:
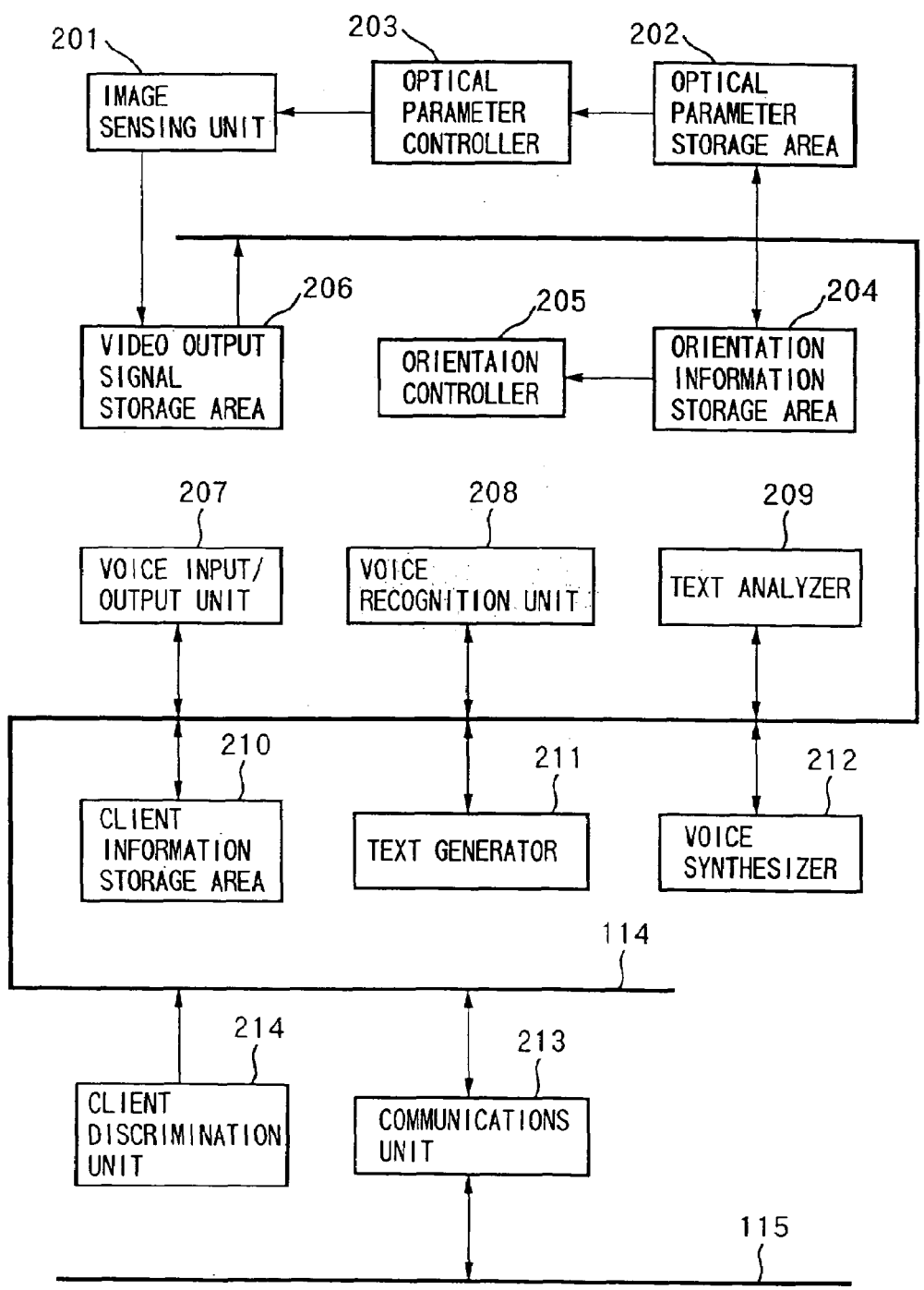
FIG. 2 is a block diagram showing the construction of a camera server according to this embodiment.

FIG. 2 is a block diagram showing the functional construction of the camera server 101 in this embodiment. As shown in FIG. 2, an image sensing unit 201 (provided within the camera unit 102) inputs an image, and an optical parameter storage area 202 retains optical parameters in the RAM 106, the optical parameters being focus, iris, shutter speed, gain, white balance and zoom magnification, etc., provided by the client, described later. The optical parameter storage area 202 holds the current status of the optical system. An optical parameter controller 203 refers to the optical parameters held in the optical parameter storage area 202 and outputs a signal that controls the optical parameters. An orientation information storage area 204 retains orientation information such as panning angle and the angle provided by the client in the RAM 106. The orientation information storage area 204 holds the current orientation information. An orientation controller 205 refers to the orientation information held in the orientation information storage area 204 and controls the shooting orientation of the image sensing unit 201. A video output signal storage area 206 retains the video output signal obtained by the image sensing unit 201 in the RAM 106.

A voice input/output unit 207 converts voice, which has entered from the microphone 111, from an analog to a digital signal and inputs the digital signal to the camera server as an audio signal, and converts a digital audio signal to an analog signal and outputs the latter from the speaker 112. A voice recognition unit 208 recognizes the waveform of a voice that has entered from the voice input/output unit 207 and outputs a character string. A text analyzer 209 analyzes the character string that has been recognized by the voice recognition unit 208.

A client information storage area 210 retains information relating to the clients connected to the network and a flag indicative of the client presently controlling the camera system in the RAM 106. FIG. 12 illustrates an example of the information held in the client information storage area 210. Items contained in the area 210 are network addresses (IP addresses in the illustration) for specifying the connected clients, the machine names of the clients, the types of machines, the names of the users who are using the machines, and flags. The flag is information indicating that the camera unit 102 is being remotely controlled. Since a plurality of users cannot control one camera simultaneously, only one flag is set per camera.

Assignment of control privilege (the privilege to remotely control the camera) has already been proposed by the present assignee. In brief, initially (when the camera server is started up) all flags are in the reset state. When a user (a client machine in this case) first issues a request to acquire the control privilege, the flag is set in regard to this user. Then, when the user subsequently relinquishes the control privilege, or when the user logs off, this flag is reset to make the control privilege available to another user.

With reference again to FIG. 2, numeral 211 denotes a text generator. If the result of analysis performed by the text analyzer 209 is that a user is requesting client information, the text generator 211 refers to the client information storage area 210 and generates response text that corresponds to the request. A speech synthesizer 212 generates a speech waveform corresponding to the generated response text.

A communications unit 213, which is connected to the network 115, accepts optical parameters, orientation information and client information from a client described later and sends a video output signal to the client. The communications unit 213 accepts these items only from a client having the control privilege; control instructions from other clients are ignored. It should be noted that video is transmitted to all connected clients irrespective of control privilege. A client discrimination unit 214 identifies the client currently controlling the camera system and changes the flag of the client stored in the client information storage area 210.

The optical parameter storage area 202, orientation information storage area 204, video output signal storage area 206, voice input/output unit 207, voice recognition unit 208, text analyzer 209, client information storage area 210, text generator 211, speech synthesizer 212 and communications unit 213 are connected to the bus 114.

Figure 3:
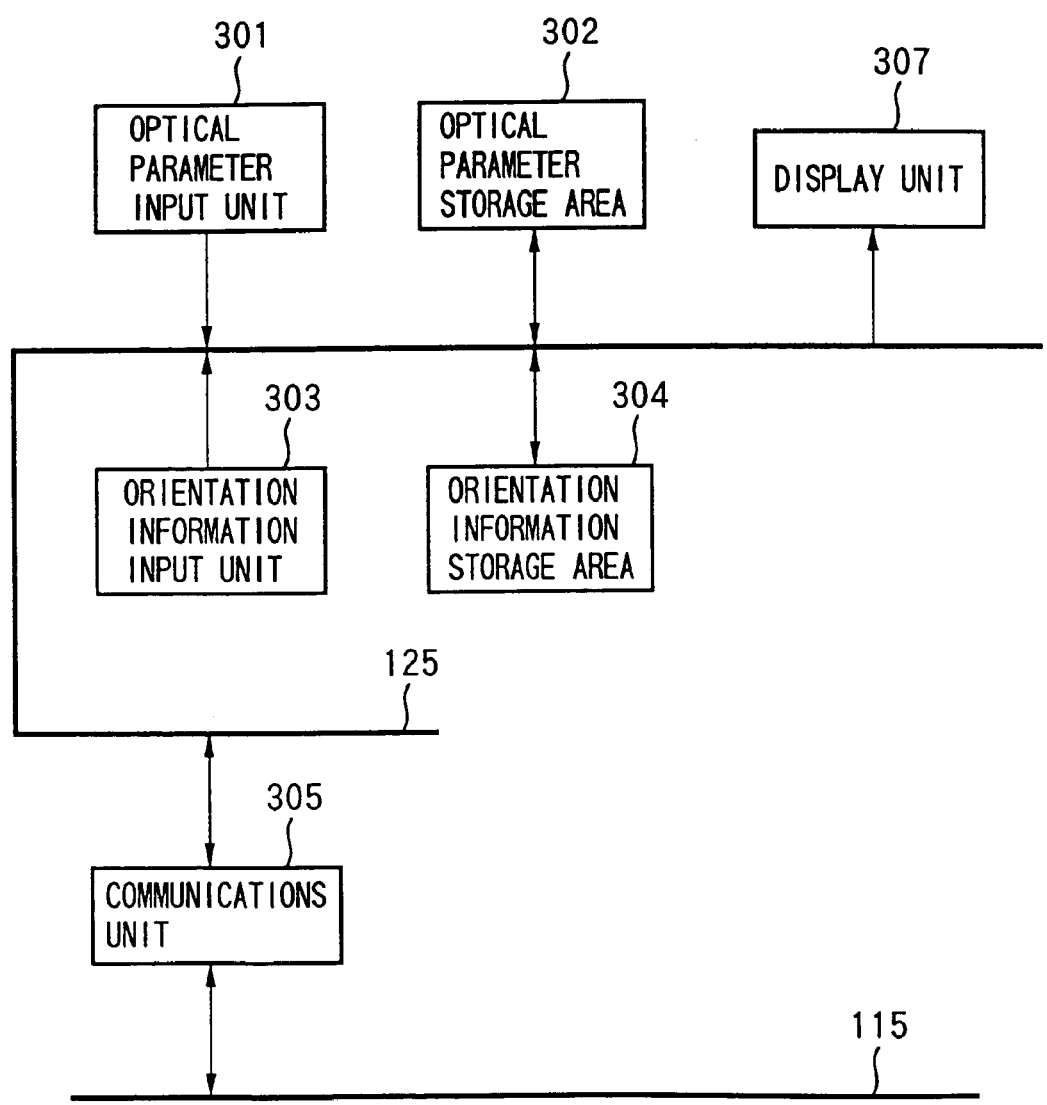
FIG. 3 is a block diagram showing the construction of a client according to this embodiment.

FIG. 3 is a block diagram showing the functional construction of the client according to this embodiment. As shown in FIG. 3, the client includes an optical parameter input unit 301 for inputting optical parameters of the camera server, which is the destination of the connection, from the keyboard 122 or mouse 123; an optical parameter storage area 302 for retaining optical parameters, which have been entered from the optical parameter input unit 301, in the RAM 118; and orientation information input unit 303 for inputting orientation information of the camera server, which is the destination of the connection, from the keyboard 122 or mouse 123; an orientation information storage area 304 for retaining orientation information, which has been entered from the orientation information input unit 303, in the RAM 118; a communications unit 305, which is connected to the network 115, for sending optical parameters, orientation information and client information to the camera server and accepting a video output signal from the camera server; and a display unit 307 for displaying the optical parameters that have been stored in the optical parameter storage area 302, the orientation information that has been stored in the orientation information storage area 304 and the video output signal accepted by the communications unit 305.

The operation of the embodiment constructed as set forth above will now be described with reference to the flowcharts of FIGS. 4 to 11.

A program (described later) for accepting video data from the camera server 101 and displaying the data runs on the client side. It is assumed that a button for designating a request to acquire control privilege and a button for designating a request to relinquish the control privilege are displayed on the display screen of the client and that these requests are communicated to the camera server as by clicking on these buttons using a pointing device such as a mouse. The display screen on the client side is additionally provided with a user interface for making various settings for the purpose of changing optical parameters and camera orientation. The description that follows is based upon a case where a plurality of clients are connected to the network, as indicated in FIG. 12, already discussed.

Figure 11:
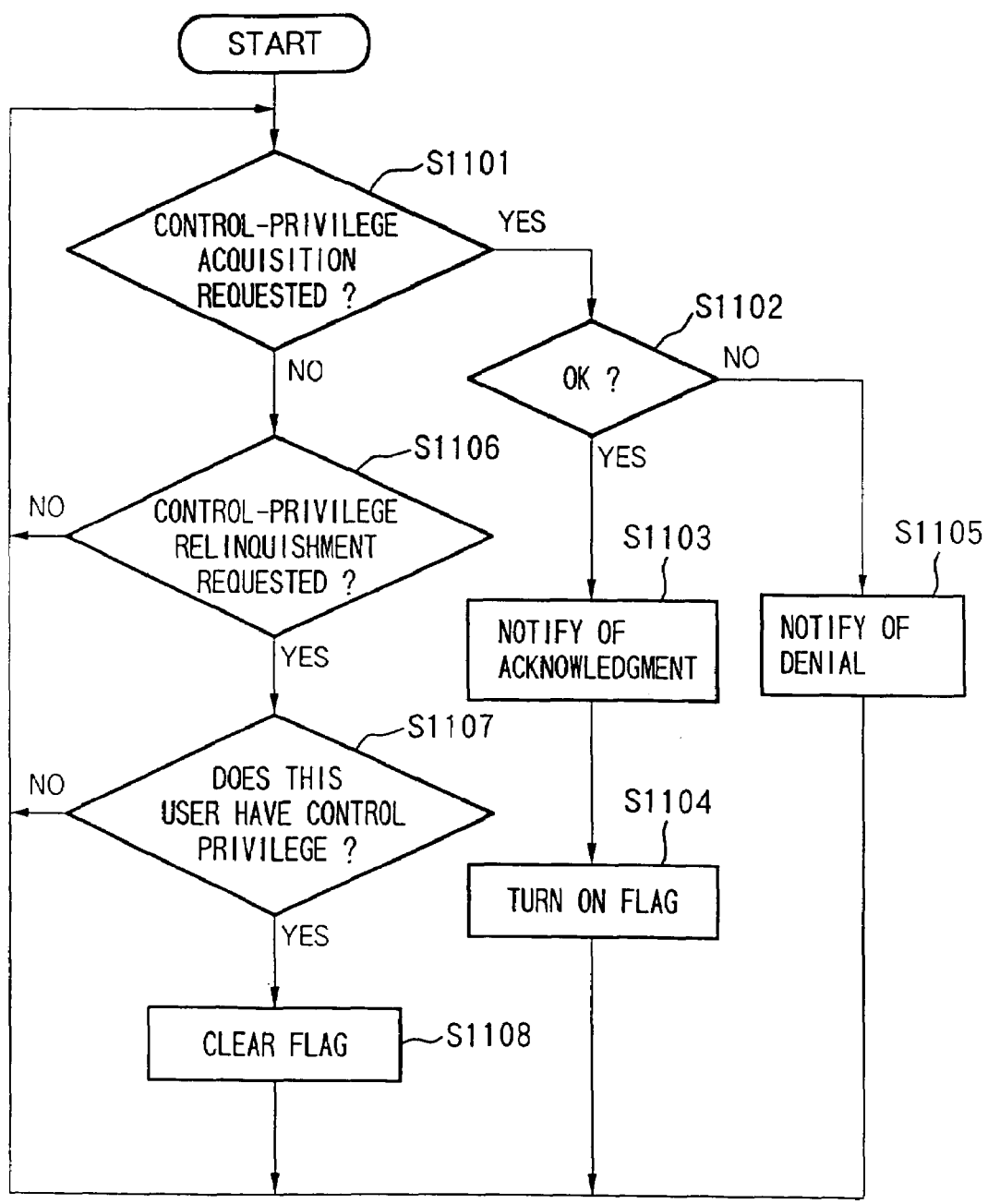
FIG. 11 is a flowchart showing processing, which is related to camera control privilege, executed by the camera server according to this embodiment.

Processing executed on the side of the camera server in a case where a request relating to the camera control privilege has been received from a client will be described in accordance with the flowchart of FIG. 11.

There are two requests relating to control privilege, namely a control-privilege acquire request and a control-privilege relinquish request. Accordingly, it is determined at steps S1101 and S1106 whether a received request relating to control privilege is the control-privilege acquire request or the control-privilege relinquish request. If it is determined that the request is the control-privilege acquire request, control proceeds to step S1102, at which the camera server refers to the client information storage area 210 (see FIG. 12), which has been reserved in the RAM 106 of the camera server, and determines whether another client having the control privilege exists (i.e., a client for which the flag is "ON"). If such a client does not exist ("YES" at step S1102), then, in order to give the control privilege to the client that issued the request, the camera server notifies this client that acquisition of the control privilege has been acknowledged (step S1103). (From this point onward the client is allowed to set the optical parameters of the camera server, change its camera orientation, etc.) Control then proceeds to step S1104, at which the relevant flag in the client information storage area 210 is turned ON.

If it is determined at step S1102 that another client has already acquired the control privilege, then the camera server issues notification to the effect that the request is denied at step S1105.

If the control-privilege relinquish request has been received, control proceeds to step S1107, at which the camera server determines whether the client that issued this request possesses the control privilege. If the control-privilege relinquish request has been received from a client possessing the control privilege, then control proceeds to step S1108 and the flag of this client is cleared.

Figure 4:
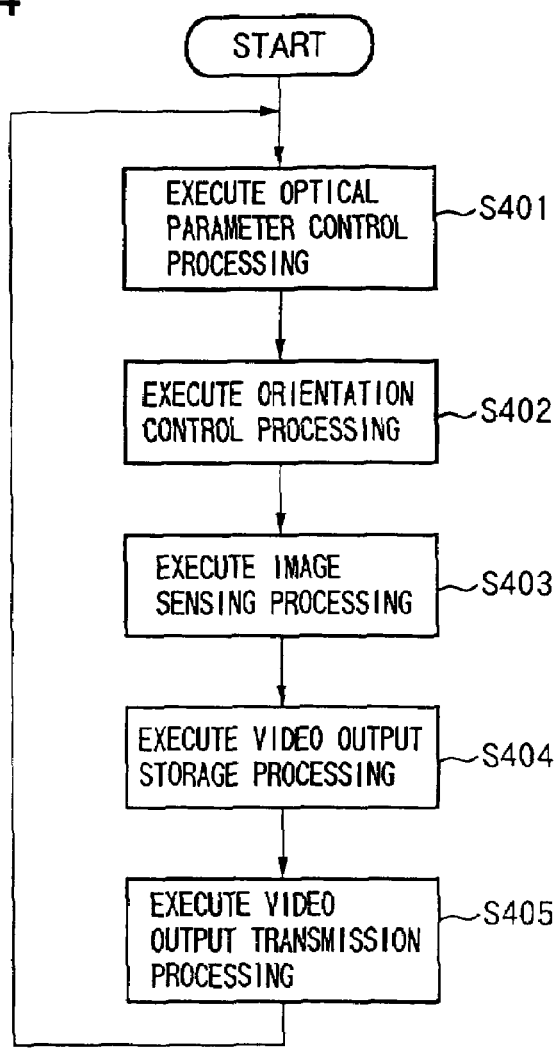
FIG. 4 is a flowchart showing camera control processing executed by the camera server according to this embodiment.

Main processing executed by the camera server will be described in accordance with the flowchart of FIG. 4.

The optical parameter controller 203 of the camera server executes processing for controlling the optical parameters (zoom, iris, etc.) at step S401 upon referring to the optical parameters stored in the optical parameter storage area 202. Control then proceeds to step S402, at which the orientation controller 205 of the camera server executes orientation control processing upon referring to the orientation information that has been stored in the orientation information storage area 204. Next, at step S403, the image sensing unit 201 executes image sensing processing. The video output signal thus obtained is stored in the video output signal storage area 206 at step S404. This is followed by step S405, at which the communications unit 213 executes video-output transmission processing for transmitting the video data to each of the connected clients through the network 115. Control then returns to step S401. It should be noted that when the video data is transmitted, it is compressed by a well-known compression method.

Figure 5:
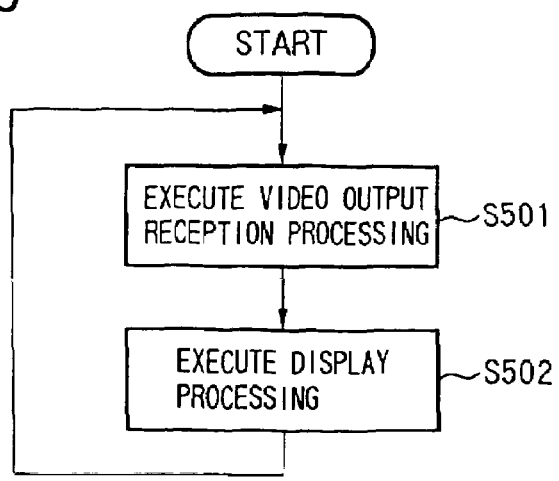
FIG. 5 is a flowchart showing processing executed by the client according to this embodiment.

FIG. 5 is a flowchart illustrating processing executed on the client side to receive video.

First, at step S501, the communications unit 305 receives video data from the network 115 and executes video-output reception processing to expand the received video data. Display processing is then executed at step S502 to display, on the display unit 307, the video data that has been received and expanded by the communications unit 305. Control then returns to step S501.

Figure 6:
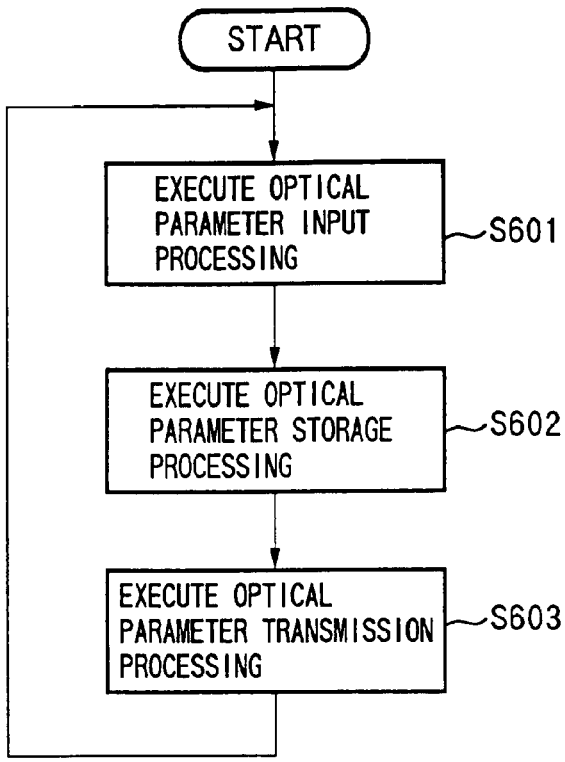
FIG. 6 is a flowchart showing processing for input of optical parameters executed by the client according to this embodiment.

FIG. 6 is a flowchart relating to control of the optical system of the camera unit 102 in the camera server. The processing of this flowchart is executed on the client side.

When the optical parameter input unit 301 enters optical parameters from the mouse or keyboard at step S601, the entered optical parameters are stored in the optical parameter storage area 302 at step S602. Next, at step S603, optical-parameter transmission processing is executed to transmit the optical parameters to the communications unit 213 of the camera server through the network 115. Control then returns to step S601.

Figure 7:
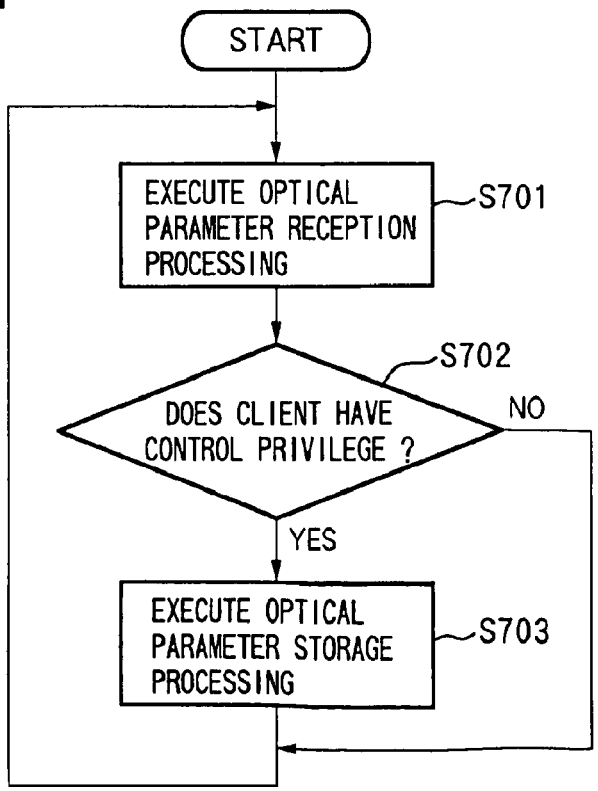
FIG. 7 is a flowchart showing processing for reception of optical parameters executed by the camera server according to this embodiment.

FIG. 7 is a flowchart illustrating processing executed by the camera server in a case where optical parameters are received from the client.

Optical parameter reception processing for receiving optical parameters from the network 115 is executed by the communications unit 213 at step S701. Next, at step S702, the camera server refers to the client information storage area 210 to determine whether the client that transmitted the received optical parameters possesses the camera control privilege. If it is determined that this client possesses the control privilege, then the received optical parameters are stored in the optical parameter storage area 202. Control then returns to step S701. The results are reflected at step S401 in the flowchart of FIG. 4.

Figure 8:
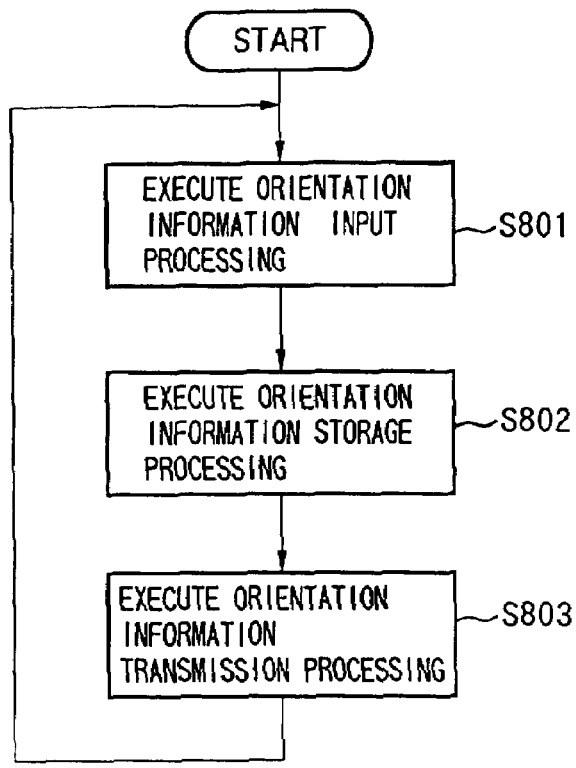
FIG. 8 is a flowchart showing processing for input of camera orientation information executed by the client according to this embodiment.

FIG. 8 is a flowchart in a case where orientation information has been entered from the orientation information input unit 303. The processing of this flowchart is executed on the client side.

When orientation information has been entered from the mouse or keyboard at step S801, the entered orientation information is stored in the orientation information storage area 304 at step S802. Next, at step S803, orientation information transmission processing is executed to transmit the orientation information to the communications unit 213 of the camera server through the network 115. Control then returns to step S801.

Figure 9:
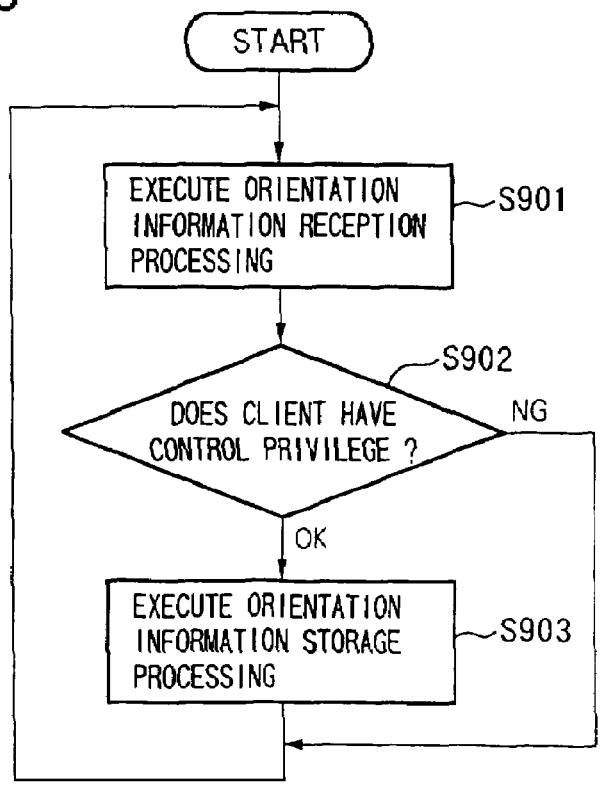
FIG. 9 is a flowchart showing processing for reception of camera orientation information executed by the camera server according to this embodiment.

FIG. 9 is a flowchart of processing executed by the camera server to receive orientation information.

The communications unit 213 executes orientation-information reception processing at step S901 to receive orientation information from the network 115. Next, at step S902, the camera server refers to the client information storage area 210 to determine whether the client that transmitted the received orientation information possesses the camera control privilege. If it is determined that this client possesses the control privilege, then the received orientation information is stored in the orientation information storage area 204. Control then returns to step S901.

As a result of the foregoing processing, each client connected to the camera server 101 is capable of remotely observing video that has been captured by the camera server. Moreover, one client upon these clients is capable of remotely controlling the optical system and orientation of the camera at will.

Processing relating to voice input executed on the side of the camera server will now be described in accordance with the flowchart of FIG. 10.

This processing is started when a voice input is detected from the microphone 111 connected to the camera server.

When voice is entered from the microphone 111, the voice input/output unit 207 executes voice input processing at step S1001 for converting the analog voice signal to a digital voice signal and loading the digital signal into the camera server. Next, the voice recognition unit 208 executes voice recognition processing at step S1002. The text analyzer 209 analyzes the results of voice recognition and analyzes the character string at step S1003. Control then proceeds to step S1004.

It is determined at step S1004 whether the result of analysis performed by the text analyzer 209 is that a user is requesting client information. This determination is performed by making a comparison with the information that has been registered in the secondary storage unit 108 and judging whether a match is obtained.

If it is determined that client information is being requested, then control proceeds to step S1005; otherwise, control returns to step S1001.

The text generator 211 refers to the client information storage area 210 and executes text generating processing to generate response text at step S1005. Control then proceeds to step S1006, at which the speech synthesizer 212 executes speech synthesizing processing to generate a voice pattern corresponding to the response text generated by the text generator 211. This is followed by step S1007, at which the voice input/output unit 207 execute voice input/output processing to convert the digital voice waveform generated by the speech synthesizer 212 to an analog signal and output the analog signal from the speaker 112. Control then returns to step S1001.

Figures 13, 14:
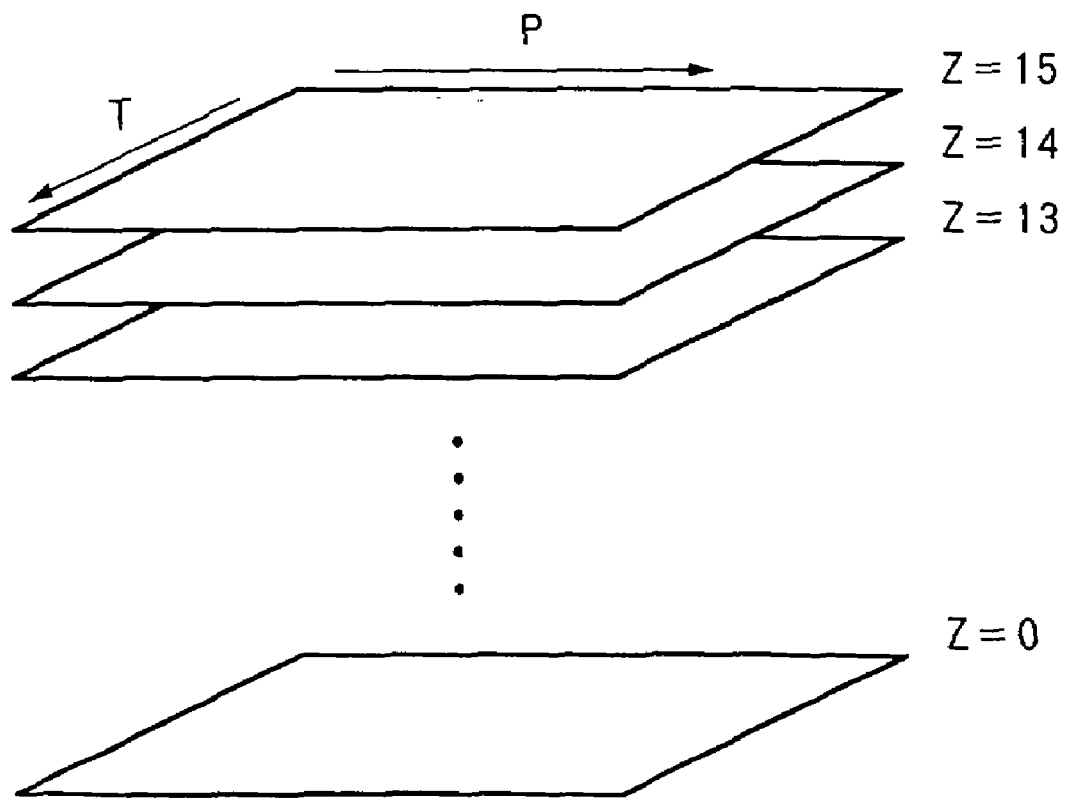
FIG. 13 is a diagram showing examples of voice responses in a first embodiment.
FIG. 14 shows the structure of data for managing objects whose video is being taken according to a second embodiment.

Dialog of the kind shown in FIG. 13 can be realized as a result of the foregoing processing. In the case illustrated, information "Who are you?" and "Where are you operating the camera from?" have been registered beforehand as requests for client information.

Further, in the case of FIG. 13, the response by voice is obtained only in regard to the client possessing the control privilege. However, since there is the individual possessing the camera control privilege and individuals who are merely observing video, an arrangement may be adopted in which responses are obtained in regard to each of these individuals. For example, in response to the question "Who are you?", the user names of all connected clients may be given in response by voice. In regard to the question "Who is operating the camera?", the response would be the user having the control privilege.

In this embodiment, the camera system is configured to accept voice input at all times. However, an arrangement may be adopted in which a voice input button is provided and a voice input is accepted only while the voice input button is being pressed.

Though the information shown in FIG. 12 has been stored in this embodiment, the camera server may be equipped with information such as the pronunciation of this information (i.e., with a dictionary file for generating pronunciation). In general, the users on the network need not use their real names. It is desirable, therefore, to adopt an arrangement in which a user is allowed to enter his or her real name and the pronunciation thereof, in addition to the network user name, when a connection is made to the camera server. This may be information obtained by sampling speech.

Though an example in which a voice inquiry is answered by voice is illustrated above, the method of responding is not limited to voice. An arrangement may be adopted in which a response is displayed on the display screen. (In this case, it would be necessary for the display unit of the camera server to be at a position close to the camera.)

Further, the request for client information is not limited to a request by voice. The request may be made by operating the keyboard or mouse or a switch or remote controller provided at a suitable location (e.g., on the camera or speaker).

Thus, in accordance with this embodiment, as described above, an individual on the side shot by the camera is capable of ascertaining the individuals who are observing the video taken by the camera and the individual who is controlling the camera.

Second Embodiment

In the first embodiment described above, text that answers with the name of the user or machine controlling the camera is generated. However, an arrangement may be adopted in which the response is the object that the camera is shooting. For example, in response to a question "What are you shooting?" regarding what a client is looking at, the answer might be "The camera is shooting in the direction of the door." Such an example will now be described as a second embodiment.

In order to implement this, video taken within limits in which shooting orientation and zoom magnification are capable of being changed is synthesized beforehand on the side of the camera server and the reading (pronunciation) of each object within these limits is registered by the camera server in advance.

The range over which the camera can be moved will be defined first. Consider the range over which the shooting orientation of the camera unit 102 can be changed. Let the range of panning angles be −50° (leftmost extreme) to +50° (rightmost extreme), and assume that the panning angle can be controlled/designated over 32 steps. Let the range of tilt angles be −20° (lowermost extreme) to +20° (uppermost extreme), and assume that the tilt angle can be controlled/designated over 16 steps. Assume that zoom can be controlled/designated over 16 steps from 1 (maximum field angle=minimum magnification) to 16 (minimum field angle=maximum magnification). In order to express the above in the form of numerical values that are easy for a computer to handle, the following equations are adopted, in which P represents the panning angle, T the tilt angle and Z the zoom value:

$$P=-50+(100-I)/31 \quad I=0, 1, 2, \ldots, 31$$

$$T=-20+(40-J)/16 \quad J=0, 1, 2, \ldots, 15$$

$$Z=k+1 \quad K=0, 1, 2, \ldots, 15$$

By employing the above-mentioned definitions, the parameters I, J, K that constitute the angles can be expressed by integral value that start with 0.

As a result, it is possible to store a three-dimensional array of 32×16×16 values as data indicating any object being shot by the camera in conformity with the camera parameters. FIG. 14 illustrates an example in which this three-dimensional array is expressed by 16 planes using zoom as a reference.

Numerical data has been stored at portions corresponding to the individual cells of each plane. A table in which what is being indicated is represented by each numerical value is registered beforehand in the manner shown in FIG. 15.

FIG. 16 illustrates an example of data representing objects shot by the camera when the zoom value is "2".

Figure 10:
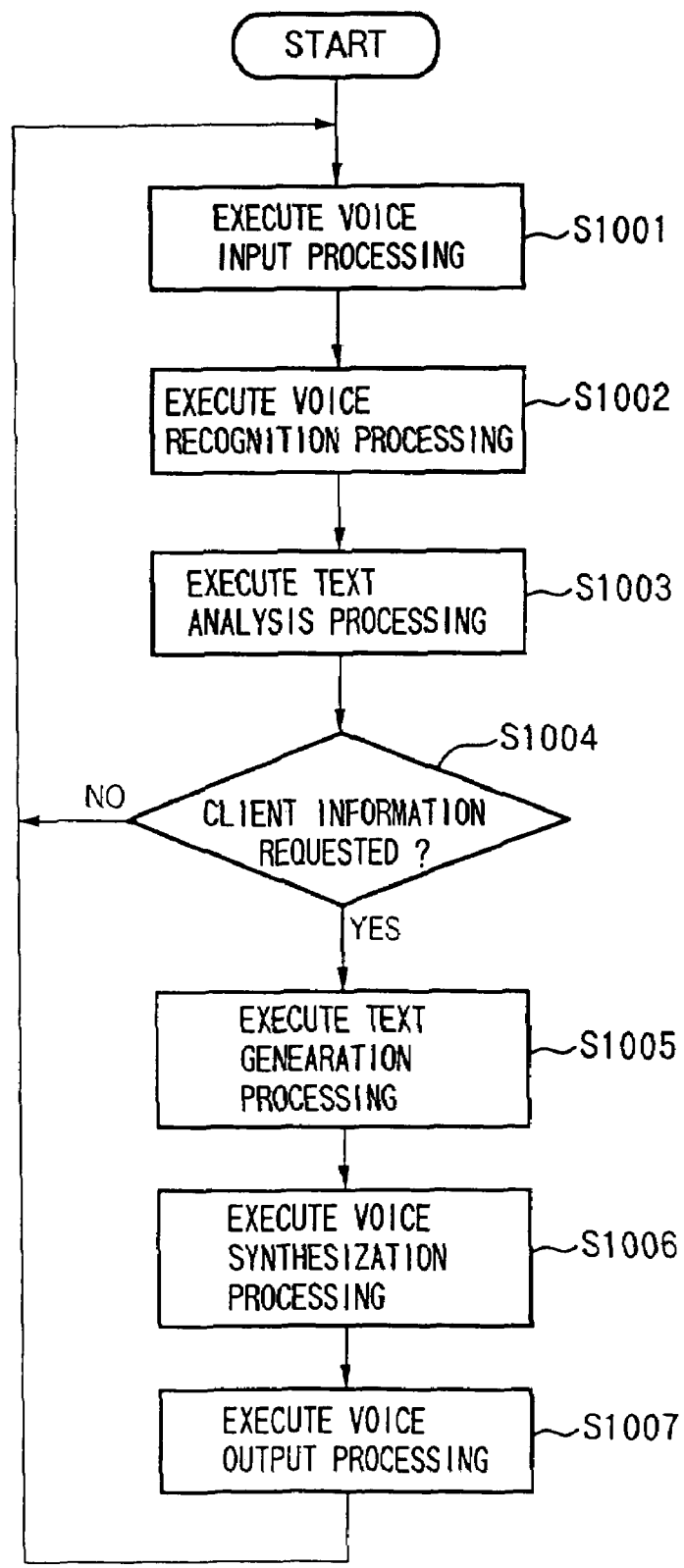
FIG. 10 is a flowchart showing voice input and response processing executed by the camera server according to this embodiment.

By utilizing this data, this embodiment can be implemented by an operation similar to that indicated by the flowchart of FIG. 10 according to the first embodiment. In a case where what is being shot is sought in the request for client information at step S1004 in FIG. 10, reference is made to the orientation information (panning and tilt angles) from the orientation information storage area 204 and to the zoom value from the optical parameter storage area 202 at the text generating processing step S1005. For example, if P=20, T=20, Z=2.0 hold, reference is had to the values that have been stored in the three-dimensional array of FIG. 14. If a value is "2", reference is had to the table of FIG. 15 and it is judged that "Door" is being shot by the camera. Accordingly, the text "The camera is shooting the door" is generated.

A case in which numerical data of a plurality of types is detected in the photographic field of view is also possible. The possibility rises if the field angle is reduced. That is, the smaller the zoom magnification, the wider the field angle and, hence, the greater the possibility. In view of these circumstances, text is generated for each type of numerical value. For example, text "The camera is shooting the door, the desk, . . . " would be generated.

The method of outputting the generated text may be by voice or display in a manner similar to that of the first embodiment. The information that triggers instructions to generate the text may be provided by a keyboard, mouse, switch or remote controller, etc., in the manner described in the first embodiment.

Third Embodiment

In the case of the second embodiment, the output of generated text is not limited to the side of the camera server; the text may be output by an output unit (speaker or display device) provided on the client side. An arrangement may be adopted in which when a user on the client side cannot tell what an object appearing in displayed video is, the user designates this portion of the display using a mouse or the like, transmits the designated position to the camera server and receives information concerning the object, whereby the user is notified (by voice or display) of what the object is. The server in such case defines, as coordinate space, the photographic field of view decided by the shooting orientation (panning and tilt angles) and zoom magnification of the camera unit shooting the object at this time, extracts the numerical value that corresponds to the object located at the position specified based upon the coordinates sent from the client, and communicates information that is based upon this numerical value to the client.

The user interface of the client in such case is as shown in FIG. 17, by way of example. The interface has a window 1700 for displaying video from the camera server. The window 1700 has a camera video display area 1701 on which a scroll bar 1702*a* for changing tilt angle and a scroll bar 1703*a* for changing panning angle are displayed. The scroll bar 1702*a* has a scroll box 1702*b* displayed at a position corresponding to the present tilt angle, and the scroll bar 1703*a* has a scroll box 1703*b* displayed at a position corresponding to the present panning angle. By operating these scroll bars and scroll boxes using a mouse cursor, the angles of the camera server can be changed. However, the change can be made only by a client that has the control privilege. If a client not possessing the control privilege performs the above-mentioned operations, there is no actual response.

A control panel 1710 is provided with a field 1711 for displaying the name of the connected camera server (entering the name of the camera server here causes the connection to be made to the camera server), a button 1712 for requesting acquisition of the control privilege, and a button 1713 for relinquishing the control privilege. A volume dial 1714 is for controlling the camera iris, and volume dial 1715 is for setting the zoom magnification. The dials 1714, 1715 function only when the control privilege has been acquired.

The items 1700 to 1715 are similar in the first and second embodiments described above.

The third embodiment differs from the first and second embodiments in the provision of a "?" button 1716. The button 1716 is capable of being operated regardless of whether the client possesses the control privilege. When the button 1716 is clicked on using the mouse, the cursor changes to one having a question mark, as indicated at 1717 in FIG. 17. If a desired position in the display area 1701 is clicked on under these conditions using the question-mark cursor, information regarding this designated position in the display area 1701 is communicated to the camera server.

Since the camera server is aware of the present camera panning angle, tilt angle and zoom magnification, it is capable of calculating which position is being indicated by the client. As a result of this calculation, information (a character string) relating to the particular object is extracted from memory and a character string is created by the camera server in a manner similar to that of the second embodiment. The camera server transmits this character string to the client, where it is displayed on the client's display unit.

In a case where voice is used as the method of reporting information on the client side, it is desired that the camera server transmit phonetic symbols serving as the pronunciation of the object designated by the server. (In the case of voice data, the amount of information will be large.) Accordingly, it is desired that the client side also be provided with means for generating a voice signal based upon the phonetic symbol information supplied. If the information need only be displayed on the display screen, then it will suffice for the camera server to merely transmit character codes corresponding to the designated object.

Fourth Embodiment

In the first embodiment, means of inputting/outputting sound, such as the microphone 111 and the speaker 112, are provided to the camera server. However, these means may be provided to another terminal except a terminal which is used for operating the camera connected to the camera server. Thus, user of the other terminal can know which client displays image shown in FIG. 17 and operates the camera connected to the camera server. The foregoing embodiments have been described for a case where the optical parameter storage area 202, orientation information storage area 204 and client information storage area 210 are reserved in the RAM 106 and the optical parameter storage area 302 and orientation information storage area 304 are reserved in the RAM 118. However, the present invention is not limited to this arrangement, for any storage medium may be used to implement these areas.

In regard to assigning the camera control privilege, it is described in the first embodiment that when one client has acquired the control privilege, the privilege is not given to another client as long as the privileged client does not relinquish the control privilege or break the connection. However, the present invention is not limited to this arrangement. For example, an arrangement may be adopted in which the maximum period of time the control privilege is assigned to one user is set. Then, when this period of time elapses, the control privilege is given to the next client in a queue. Alternatively, the control privilege may be assigned in regular order to users (who have been registered in advance) among a group thereof whose level allows them to be given the control privilege.

Further, in the foregoing embodiments, a camera, hardware for controlling the camera, hardware for the connection to the network and voice input/output equipment are required on the side of the camera server, and hardware for implementing the above is required on the client side as well. However, the basic functions can be realized by a general-purpose information processing apparatus such as a workstation or personal computer. In other words, such an information processing apparatus can be made to execute a program for performing the above-mentioned operations.

According to the embodiment, a video camera for generating moving-image information is used as an example of the image sensing means. However, this does not impose a limitation upon the present invention because the image sensing means may be a flat-head scanner or a video camera that generates still images. In the case of the flat-head scanner, the scanner is used in combination with an automatic document feeder and a page of a document scanned is selected. Communicating the selected page number to a client would correspond to communicating information relating to an object in the present invention.

The Internet or a local network may be the network. In other words, there is no limitation upon the type of network that can be used.

It goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the foregoing embodiment, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

Thus, in accordance with the present invention, as described above, it is possible to obtain information which identifies a client that is being transmitted video taken using image sensing means. In particular, by using voice as means for reporting information, it is possible to achieve reporting that is ideal for a user interface.

Further, in accordance with another aspect of the present invention, an object that is being imaged can be ascertained.

As many apparently widely different embodiments of the present invention can be made without departing from the spirit and scope thereof, it is to be understood that the invention is not limited to the specific embodiments thereof except as defined in the appended claims.

What is claimed is:

1. A server for controlling a plurality of clients, said server comprising:
    a control device, adapted to (a) select at least one client which has a privilege for controlling an image sensing device remotely, (b) prohibit unselected clients from controlling the image sensing device while the selected client is controlling the image sensing device, and (c) enable the unselected clients to receive video information captured by the image sensing device;
    a voice input unit, adapted to input a voice of a user which is not one of the clients but an object being captured by the image sensing device;
    a recognition unit, adapted to recognize the voice input by said voice input unit; and
    a notification device, adapted to notify the user as the captured object, as to which client is selected for controlling the image sensing device and which clients receive the video information captured by the image sensing device, when said recognition unit recognizes a voice pattern which represents a request for information about the clients from the voice input by said voice input unit.

2. A server according to claim 1, wherein the image sensing device is a camera having a two-dimensional image sensing device.

3. A server according to claim 1, wherein control of the image sensing device includes optical control and orientation control.

4. A server according to claim 1, wherein information notified by said notification device includes user names of the clients.

5. A server according to claim 4, wherein said notification device notifies by voice.

6. A server according to claim 1, wherein said notification device notifies by voice.

7. A method of controlling a plurality of clients, said method comprising:

a control step, of selecting at least one client which has a privilege for controlling an image sensing device remotely, prohibiting unselected clients from controlling the image sensing device while the selected client is controlling the image sensing device, and enabling the unselected clients to receive video information captured by the image sensing device;

a voice input step, of inputting a voice of a user which is not one of the clients but an object being captured by the image sensing device;

a recognition step, of recognizing the voice input in said voice input step; and a notification step, of notifying the user as the captured object, as to which client is selected for controlling the image sensing device and which clients receive the video information captured by the image sensing device, when said recognition step recognizes a voice pattern which represents a request for information about the clients from the voice input in said voice input step.

8. A method according to claim 7, wherein the image sensing device is a camera having a two-dimensional image sensing device.

9. A storage medium storing program code executing a method of controlling a plurality of clients via the communication medium, said program code comprising:

code for a control step, of selecting at least one client which has a privilege for controlling an image sensing device remotely, prohibiting unselected clients from controlling the image sensing device while the selected client is controlling the image sensing device, and enabling the unselected clients to receive video information captured by the image sensing device;

code for a voice input step, of inputting a voice of a user which is not one of the clients but an object being captured by the image sensing device;

code for a recognition step, of recognizing the voice input in said voice input step; and code for a notification step, of notifying the user as the captured object as to which client is selected for controlling the image sensing device and which clients receive the video information captured by the image sensing device, when said recognition step recognizes a voice pattern which represents a request for information about the clients from the voice input in said voice input step.

10. A storage medium according to claim 9, wherein the image sensing device is a camera having a two-dimensional image sensing device.

11. A system comprising at least one client, and a server for controlling the at least one client, said server comprising:

a control device, adapted to (a) give the at least one client a privilege for controlling an image sensing device remotely, (b) prohibit unprivileged clients from controlling the image sensing device while the privileged client is controlling the image sensing device, and (c) enable the unprivileged clients to receive video information captured by the image sensing device;

a voice input unit, adapted to input a voice of a user which is not one of the clients but an object being captured by the image sensing device;

a recognition unit, adapted to recognize the voice input by said voice input unit; and a notification device, adapted to notify the user as the captured object, as to which client is selected for controlling the image sensing device and which clients receive the video information captured by the image sensing device, when said recognition unit recognizes a voice pattern which represents a request for information about the clients from the voice input by said voice input unit.

12. A system according to claim 11, wherein the image sensing device is a camera having a two-dimensional image sensing device.

* * * * *